United States Patent
Zou et al.

(10) Patent No.: US 9,357,028 B2
(45) Date of Patent: May 31, 2016

(54) METHOD AND SYSTEM FOR PROCESSING REQUEST MESSAGE, AND LOAD BALANCER DEVICE

(75) Inventors: Xianjun Zou, Shenzhen (CN); Heng Chang, Shenzhen (CN); Sihao Li, Shenzhen (CN); Qifeng Ma, Shenzhen (CN); Yan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 307 days.

(21) Appl. No.: 13/480,141

(22) Filed: May 24, 2012

(65) Prior Publication Data

US 2012/0233248 A1    Sep. 13, 2012

Related U.S. Application Data

(63) Continuation of application No. PCT/CN2010/078553, filed on Nov. 9, 2010.

(30) Foreign Application Priority Data

Nov. 24, 2009  (CN) .......................... 2009 1 0226176

(51) Int. Cl.
*G06F 15/16* (2006.01)
*H04L 29/08* (2006.01)
*H04L 12/803* (2013.01)

(52) U.S. Cl.
CPC .......... *H04L 67/2819* (2013.01); *H04L 47/125* (2013.01); *H04L 67/1002* (2013.01); *H04L 67/28* (2013.01)

(58) Field of Classification Search
CPC . H04L 12/54; H04L 67/1002; H04L 67/1014; H04L 67/1008; H04L 67/327; H04L 67/1029; H04L 69/329

USPC .............. 709/203, 223, 224, 226, 229, 238; 707/E17.005, E17.044
See application file for complete search history.

(56) References Cited

U.S. PATENT DOCUMENTS 6,732,175 B1 *   5/2004  Abjanic ........................ 709/227
7,448,022 B1 *  11/2008  Ram et al. ..................... 717/120
(Continued)

FOREIGN PATENT DOCUMENTS

CN       1489069 A       4/2004
CN       1512333 A       7/2004
(Continued)

OTHER PUBLICATIONS

International Search Report and Written Opinion of the International Searching Authority issued in corresponding PCT Patent Application No. PCT/CN2010/078553, mailed Feb. 10, 2011.
Yanqi et al., "A Content-based Load-balancing Algorithm of Web Cluster" Computer Engineering, vol. 31, No. 2 Jan. 2005.
(Continued)

*Primary Examiner* — Joshua Joo
(74) *Attorney, Agent, or Firm* — Brinks Gilson & Lione (57) ABSTRACT

A method and a system for processing a request message, and a load balancer device are provided. The load balancer obtains a service name and an operation name through simple string matching, and a large amount of computing is performed at a server side, thereby solving a session hold problem of a composition engine cluster, reducing a computing task of a load balancer, maximizing a fan-out capability of the load balancer, and increasing a throughput of the composition engine cluster to a maximum extent, therefore satisfying a demand for a large capacity of a composition engine.

11 Claims, 4 Drawing Sheets

(56) References Cited

U.S. PATENT DOCUMENTS

| | | | |
|---|---|---|---|
| 7,587,487 B1* | 9/2009 | Gunturu | 709/224 |
| 7,660,894 B1* | 2/2010 | Carrie | 709/225 |
| 2002/0010783 A1* | 1/2002 | Primak et al. | 709/228 |
| 2002/0035642 A1* | 3/2002 | Clarke | H04L 47/10 709/244 |
| 2003/0037108 A1* | 2/2003 | Peiffer et al. | 709/203 |
| 2005/0086297 A1* | 4/2005 | Hinks | 709/203 |
| 2005/0132086 A1* | 6/2005 | Flurry et al. | 709/238 |
| 2005/0198303 A1* | 9/2005 | Knauerhase et al. | 709/227 |
| 2006/0047742 A1* | 3/2006 | O'Neill et al. | 709/203 |
| 2006/0080419 A1* | 4/2006 | Patrick et al. | 709/220 |
| 2008/0134293 A1* | 6/2008 | Storm | 726/4 |
| 2008/0140857 A1* | 6/2008 | Conner et al. | 709/236 |
| 2008/0235397 A1 | 9/2008 | Degenaro et al. | |
| 2009/0106456 A1* | 4/2009 | Muller et al. | 710/5 |

FOREIGN PATENT DOCUMENTS

| | | |
|---|---|---|
| CN | 1992621 A | 7/2007 |
| CN | 101146211 A | 3/2008 |
| CN | 101207550 A | 6/2008 |
| CN | 101247349 A | 8/2008 |
| CN | 101252591 A | 8/2008 |
| CN | 101364971 A | 2/2009 |
| CN | 101379757 A | 3/2009 |
| CN | 101510870 A | 8/2009 |

OTHER PUBLICATIONS

Min et al., "Prediction Based Load Balance Algorithm in Context-aware Application Server" Computer Engineering, vol. 34, No. 3 Feb. 2008.

Chinese Patent No. 102075409, issued on Mar. 20, 2013, granted in corresponding Chinese Patent Application No. 200910226176.8.

* cited by examiner

METHOD AND SYSTEM FOR PROCESSING REQUEST MESSAGE, AND LOAD BALANCER DEVICE

CROSS-REFERENCE TO RELATED APPLICATIONS

This application is a continuation of International Application No. PCT/CN2010/078553, filed on Nov. 9, 2010, which claims priority to Chinese Patent Application No. 200910226176.8, filed on Nov. 24, 2009, both of which are hereby incorporated by reference in their entireties.

FIELD OF THE INVENTION

The present invention relates to the field of communications technologies, and in particular, to a method and a system for processing a request message, and a load balancer device.

BACKGROUND OF THE INVENTION

With rapid development, the Internet has been applied in and brought great influence to every aspect of people's daily life, work, and study. With continuous improvement of microprocessor performance and Internet infrastructure, more and more computing devices are connected to the Internet. As basic capabilities of the Internet are improved, the number of applications is increased and basic service capabilities get richer and richer. Especially, various personalized demands of people experience explosive growth. It is an irresistible trend to create various innovative applications by combining existing service capabilities. It is an essential technical means to meet personalized demands of users that a composition engine generates new applications by connecting various services in series through streamlining a script.

From the perspective of system capacity, complicated application systems and rising user groups require that a computer system where the composition engine runs possess increasingly enhanced computing power. Usually, the system capacity considered when the system is initially designed and established appears to be insufficient. If the original system is abandoned and replaced by a more powerful new system, original investment cannot be protected, therefore increasing the overall cost of the system. The increase of the system capacity generally relies on the improvement of the processing capability of computing components or the increase of the number of computing components. Over years of research and development, remarkable achievements have been made in conventional parallel processing and cluster computing technologies in terms of architecture, operating system, parallel algorithm, and programming language, effectively solving problems of system computing power and capacity expansion.

As a key technology of the cluster computing, the load balancer is widely applied. The load balancing technology mainly has features in three aspects: implementation of load balancing algorithms, health detection, and session hold. Almost all WEB application programs have session states, for example, recording whether a user logs in. Since a HyperText Transport Protocol (HTTP) does not have a state, the session state should be stored in a server and associated with a current browsing session of the user. In this way, when the user requests the same WEB application program page next time, the user can easily obtain the page again. When the load is balanced, an optimal choice is to distribute a particular browser session to the same server as the last time. Load balancing solutions, such as a "Cookie" insert mode in "Big-IP" and a commercial composition engine system provided by Oracle, all provide preferable cluster solutions to expand the system capacity, so as to satisfy the demand of users. Such load balancing solutions play an important role in the WEB cluster.

During the implementation of the present invention, the inventors find that the prior art at least has the following problems. The "Cookie" insert mode can solve the session hold problem based on WEB, and solve the session hold problem for requests from the same client. However, since an instance in the composition engine may come from requests of multiple clients, the method fails to solve the session hold problem of the composition engine. In addition, in the load balancing solution provided by Oracle, the load balancer at a foreground does not need to consider the session hold problem of the system, all script states are saved in a background database, and after a subsequent request enters the background database, the script state may be recovered by the database before continuing execution. However, recovery or writing of the script states in the database requires a large quantity of resources and greatly affects the system performance. Moreover, persistence and recovery need to be performed on all the states by using the database, which may cause a performance bottleneck.

Moreover, the composition engine possesses many features. Especially, in session continuity, the composition engine is different from a commonly used mechanism of the WEB applications. Therefore, the load balancing solutions in the prior art fail to meet the demand of the composition engine.

SUMMARY OF THE INVENTION

According to a load balancing requirement of a composition engine, embodiments of the present invention provide a method and a system for processing a request message, and a load balancer, so as to satisfy a demand for a large capacity of the composition engine.

An embodiment of the present invention provides a method for processing a request message, where the method includes:

receiving and parsing a request message sent by a request end, and obtaining a script name corresponding to the request message and a message type of the request message;

obtaining a target server of the request message according to a server list corresponding to the script name and the message type, and forwarding the request message to the target server; and receiving a response message returned by the target server after the target server executes a script corresponding to the script name, and returning a response message that satisfies a return condition to the request end.

An embodiment of the present invention provides a load balancer device, where the device includes:

a first processing module, configured to receive and parse a request message sent by a request end, and obtain a script name corresponding to the request message and a message type of the request message;

a second processing module, configured to obtain a target server of the request message according to a server list corresponding to the script name and the message type, and forward the request message to the target server; and a third processing module, configured to receive a response message returned by the target server after the target server executes a script corresponding to the script name, and return a response message that satisfies a return condition to the request end.

An embodiment of the present invention provides a system for processing a request message, where the system includes a request end and multiple servers, and further includes the load balancer device disposed between the request end and the multiple servers.

In the method and system for processing the request message and the load balancer device according to the embodiments of the present invention, the load balancer forwards the request message to the target server through the script name corresponding to the request message and the message type of the request message, the target server makes a response and returns a response message, and the load balancer selects the proper response message and returns the proper response message to the request end. In this way, the load balancer obtains a service name and an operation name through simple string matching, and a large amount of computing is performed at a server side, thereby solving the session hold problem of a composition engine cluster, reducing the computing task of the load balancer, maximizing the fan-out capability of the load balancer, and increasing the throughput of the composition engine cluster to a maximum extent, therefore satisfying the demand for a large capacity of the composition engine.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only a part of embodiments of the present invention, and persons of ordinary skill in the art can derive other drawings from the accompanying drawings without creative efforts.

DETAILED DESCRIPTION OF THE EMBODIMENTS

To make the objects, technical solutions, and advantages of the embodiments of the present invention clearer, the technical solutions in the embodiments of the present invention are clearly and completely described in the following with reference to the accompanying drawings in the embodiments of the present invention. Apparently, the described embodiments are only a part of, rather than all embodiments of the present invention. Persons of ordinary skill in the art can derive other embodiments based on the embodiments of the present invention without creative efforts, which all fall within the scope of the present invention.

A composition engine is different from mechanisms in the prior art, such as the "cookie" technology of "http". For the composition engine, a specific script instance can be located only through a service name, an operation name, and a "correlation" value, where the service name and the operation name may be obtained through simple string matching, but the "correlation" value must be obtained by parsing a complete Simple Object Access Protocol (SOAP) message by an Extensible Markup Language (XML) parser and performing locating with a language for searching for information in an XML document, that is, XML Path Language (XPATH).

A server can be regarded as a composition engine in the embodiments of the present invention. The service name, operation name, and "correlation" value are described in detail below with reference to an actual example.

A complete SOAP request message is taken as an example for description below, where "WeatherService" is the service name, "getWeather" is the operation name, and the field "correlation" is decided by a script that is run on the composition engine. However, in this example, "Shenzhen" may be the "correlation" value. Assume that "Shenzhen" is the "correlation" value herein.

```
POST /WebServices/WeatherService HTTP/1.1
Host: webservice.webxml.com.cn
Content-Type: text/xml; charset=utf-8
Content-Length: length
SOAPAction: "http://WebXml.com.cn/getWeather"
<?xml version="1.0" encoding="utf-8"?>
<soap:Envelope
    xmlns:xsi="http://www.w3.org/2001/XMLSchema-instance"
 xmlns:xsd="http://www.w3.org/2001/XMLSchema"
 xmlns:soap="http://schemas.xmlsoap.org/soap/envelope/">
    <soap:Body>
       <getWeather xmlns="http://WebXml.com.cn/">
          <theCityCode>shenzhen</theCityCode>
          <theUserID>zarmy</theUserID>
       </getWeather>
    </soap:Body>
 </soap:Envelope>
```

Both XML parsing and XPATH locating occupy a large amount of computing and storage resources. If the obtaining of the "correlation" value is also performed at a load balancer side, the computing amount is increased and a throughput of a cluster is reduced. Meanwhile, if the "correlation" value is obtained and accurately distributed by the load balancer, the server is further required to report all "correlation" values to be received for running instances to the load balancer, so as to perform matching, thereby further increasing the computing amount of the load balancer and reducing the throughput of the cluster.

The composition engine receives a request message that is matched properly (the service name, operation name, and "correlation" all match the instance) and triggers the instance for further processing. If the server fails to find a matching instance, the request is rejected. In view of the above features of the composition engine, the embodiments of the present invention provide a load balancing solution based on redundant distribution, that is, the load balancer only parses the service name and the operation name of the request message, obtains a script name corresponding to the request message through the service name, and judges whether the request message is an initial message through the operation name. If the request message is the initial message of a script, the request message is sent to a proper server. If the request message is not the initial message of the script, the request message is group-sent to all servers that are currently running the script corresponding to the script name. The load balancer receives response messages sent by the servers, and sends a proper response message among the received response messages to a request end. The load balancing solution based on distribution redundancy provided in the embodiments of the present invention according to the features of the composition engine is capable of solving the session hold problem of the composition engine cluster and reducing the computing task of the load balancer.

Figure 1:
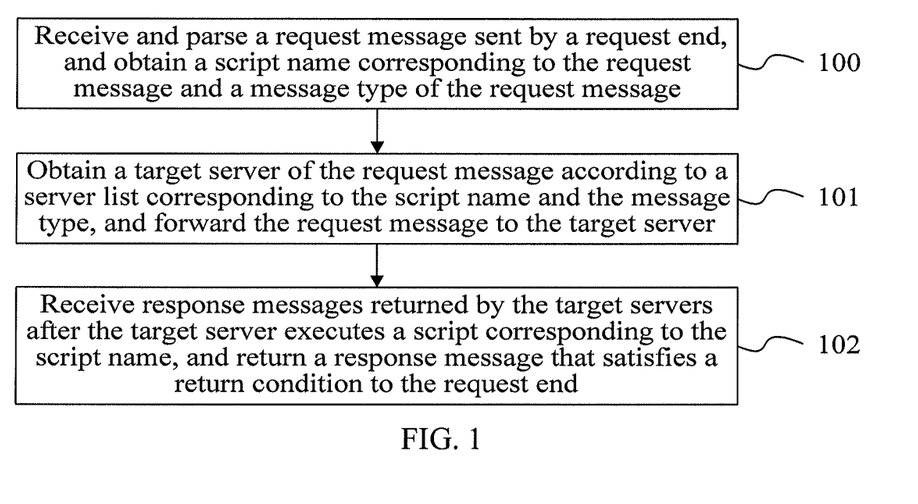
FIG. 1 is a flow chart of a method for processing a request message according to Embodiment 1 of the present invention.

FIG. 1 is a flow chart of a method for processing a request message according to Embodiment 1 of the present invention. As shown in FIG. 1, the method includes the following steps.

Step 100: Receive and parse a request message sent by a request end, and obtain a script name corresponding to the request message and a message type of the request message.

A load balancer disposed between the request end and multiple servers is configured to distribute request messages from different request ends among the multiple servers to ensure load balancing among the multiple servers as far as possible. When receiving a request message from a request end, the load balancer first parses the request message to obtain a service name and an operation name. Specifically, the service name may be obtained from a string "http url", and the operation name may be obtained from subelements of "SOAP BODY", that is, the two parameters can be obtained by parsing a SOAP message header and through simple string matching.

After obtaining the two parameters including the service name and operation name through parsing, the load balancer obtains the script name corresponding to the request message according to the service name, and judges the message type of the request message through the operation name, namely, judges whether the request message is an initialization message of a script corresponding to the script name. The load balancer may perform corresponding processing according to whether the request message is an initialization message or a non-initialization message.

Step 101: Obtain a target server of the request message according to a server list corresponding to the script name and the message type, and forward the request message to the target server.

If the message type of the request message is an initialization message, the process that the load balancer obtains the target server to which the request message is forwarded according to the server list corresponding to the script name and the obtained message type and forwards the request message may specifically include the following situations. Since the request message is an initialization message, one target server exists.

First, the server list that is currently serving the script name is queried. The server list corresponds to each script name. That is to say, each script name is corresponding to one server list that records server information running a script instance corresponding to the script name. The server information may be server addresses. Servers that have run the script instance but are not deleted from the server list and servers that are running the script instance can be known from the server list. The servers recorded in the server list are a part of all servers in network deployment, or a part of servers in an entire system. Servers that are currently not running the script instance are not recorded in the server list. After obtaining the server list corresponding to the script name through query, it is judged whether the server list is empty. If the server list is empty, it indicates that no server has run the script instance before. Moreover, all servers are capable of running the script according to features of a composition engine. Therefore, the load balancer may select a server among all servers in the entire network system as the target server. Of course, the selected target server should meet certain restrictions, for example, in order to satisfy load balancing, it is required that a server currently with the least load among all servers that are not overloaded should be selected as the target server. A specific selection mode may be traversing the entire server list from beginning to end, finding out all servers that are not overloaded, and selecting the server with the least load. After selecting the target server, the load balancer forwards the request message to the target server and adds an address, for example, an Internet Protocol (IP) address, of the target server to the server list corresponding to the script name, so as to indicate that the server is running the script instance.

When the load balancer judges whether the server list is empty, if it is known that the server list is not empty through judgment, it indicates that servers have run the script instance before. Then, a server that is not overloaded among servers recorded in the server list is selected as the target server, and the request message is forwarded to the selected target server. Specifically, the load balancer traverses the server list corresponding to the script name to obtain a first server that is not overloaded, and forwards the request message to the server if any.

In the above process, if no server that is not over loaded is found after the server list corresponding to the script name is traversed, that is, all servers recorded in the server list corresponding to the script name are overloaded, a server that is not recorded in the server list and is not overloaded among all servers in the entire system is selected, that is, a server with the least load among servers that are not recorded in the server list and are not overloaded may be selected as the target server. Specifically, all servers beyond the server list may be traversed, that is, servers that are not overloaded among servers in the entire system are found out, and the server with the least load is selected. After selecting the target server, the load balancer forwards the request message to the target server and adds the address, for example, an IP address, of the target server to the server list, so as to indicate that the server is running the script instance.

In the above process, if no server that is not overloaded is found after the server list corresponding to the script name is traversed, that is, all servers in the server list corresponding to the script name are overloaded, and moreover, it is known that still no server that is not overloaded exists after all servers beyond the server list, namely, all servers that are not recorded in the server list in the entire system, are traversed, that is, all servers are overloaded, it indicates that no server is capable of running the script instance. Therefore, the load balancer may reject the request message, and the process ends.

If the message type of the request message is not an initialization message, the process that the load balancer obtains the target server to which the request message is forwarded according to the server list corresponding to the script name and the obtained message type and forwards the request message may specifically include the following situations. Since the request message is not an initialization message, multiple target servers may exist.

First, the server list that is currently serving the script corresponding to the script name is queried. It is judged whether the server list is empty. If the server list is empty, it indicates that no server has run the script instance before. Therefore, the request message may be directly discarded, namely, rejected, and the process ends. If it is known that the server list is not empty, all servers recorded in the server list corresponding to the script are selected as the target servers, and the request message is forwarded to all the target servers.

In the above situations, before or after the load balancer forwards the request message to the target server(s), a step that the load balancer records a connection mapping relationship between the request end and the target server may be included. After the load balancer forwards the request message to the determined target server(s), in order to ensure that a response message returned by the target server can be accurately returned to the corresponding request end, the load balancer further needs to record the connection mapping relationship. Specifically, the connection mapping relationship may be recorded in the server list, so as to record the servers to which the request message sent by the request end is forwarded. A length of the server list indicates the number of the servers that respond to the request message sent by the request end. For example, if the request message is an initialization message, the list length of the server list corresponding to the request message is "1". If the list length of the server list is "2", it indicates that the load balancer forwards the request message to two servers.

Step 102: Receive a response message returned by the target servers after the target server executes a script corresponding to the script name, and return a response message that satisfies a return condition to the request end.

After the load balancer forwards the request message to the determined target server(s), the target server receives the request message and triggers the instance for further processing. If the server fails to find a matching instance, the server rejects the request, namely, returns a rejection message to the load balancer. If the server finds a matching instance, the server executes the script instance and returns a response message indicating successful execution to the load balancer. The response message that satisfies the return condition refers to that if a success response message exists, the success response message satisfies the return condition. If no success response message exists, the last failure response message is the response message that satisfies the return condition. Specifically, if the load balancer receives the response message indicating successful execution returned by the server, the load balancer may directly return the success response message to the request end. If all the servers return rejection messages to the load balancer, the load balancer returns the last received rejection message to the request end.

After receiving the response message returned by the target server, if the load balancer knows that the list length of the server list corresponding to the request message is "1", the load balancer directly forwards the response message returned by the target server after the target server executes the script corresponding to the script name to the request end. When the load balancer knows that the list length of the server list is "1", the load balancer may directly forward the response message returned by the target server to the request end, which includes two situations. In one situation, the target server returns a success response message to the load balancer after correctly running the script instance, and the load balancer forwards the success response message to the request end. In the other situation, for example, when the service name is correct while the operation name is not matched; or when the service name and the operation name are correct while the "correction" value is not matched, the target server returns a rejection message to the load balancer; at this time, the load balancer also needs to forward the rejection message to the request end.

After receiving the response message returned by the target server, if the load balancer knows that the list length of the server list corresponding to the request message is greater than "1", the load balancer forwards the response message indicating successful execution among multiple response messages returned by the multiple target servers after the target servers execute the script corresponding to the script name. When the list length of the server list is greater than "1", it indicates that the load balancer sends the request message to several servers at the same time to request execution of the script instance. Only one server is capable of correctly executing the script and returning the response message indicating successful execution, namely, the success response message, and all other servers return rejection messages. Therefore, after receiving a rejection message, the load balancer may directly discard the rejection message and delete the connection mapping relationship in the server list to release resources; and after receiving a success response message, the load balancer may send the success response message to the request end according to the connection mapping relationship information recorded in the server list, and delete the connection mapping relationship in the server list, namely, release all resources corresponding to the connection mapping relationship. If all the target servers return rejection messages since the service name is correct while the operation name is not matched, or all the target servers return rejection messages since the service name and the operation name are correct while the "correction" value is not matched, the load balancer directly returns the last received rejection message to the request end according to the connection mapping relationship information recorded in the server list, so as to indicate that the execution of the script instance fails. Of course, subsequently, the connection mapping relationship in the server list should be deleted to release resources.

In the above process, after receiving the rejection message returned by the target server, the load balancer may delete the connection mapping relationship of the server list, namely, release all resources corresponding to the connection mapping relationship.

In the method for processing the request message according to the embodiment of the present invention, the load balancer forwards the request message to the target server through the script name corresponding to the request message and the message type of the request message, the target server makes a response and returns a response message, and the load balancer selects the success response message to return to the request end. In this way, the load balancer obtains the service name and the operation name through simple string matching, and the obtaining of the "correction" value is performed at the server side, thereby solving the session hold problem of the composition engine cluster, reducing the computing task of the load balancer, maximizing the fan-out capability of the load balancer, and increasing the throughput of the composition engine cluster to a maximum extent, therefore satisfying the demand for a large capacity of the composition engine.

In the above embodiments, after the load balancer obtains the target server to which the request message is forwarded according to the server list corresponding to the script name and the message type, and forwards the request message to the target server, the method may further include setting a time stamp of the target server recorded in the server list to a current time. The load balancer sets the time stamp for the target server, so as to record the time when the target server is requested to execute the script instance.

According to what is preset, all servers in the entire system need to periodically report a script list that is currently not run to the load balancer, after the load balancer periodically receives the script list that is not run reported by the target server and records a report time, the load balancer compares the report time and the time stamp of the target server in the server list corresponding to the script name. If the report time is later than the corresponding time stamp, it indicates that the target server in the server list corresponding to the script name on the load balancer has run the script. Then the load balancer may delete the address, for example, the IP address, of the target server from the server list.

In this embodiment, by recording the time stamp of the server and periodically collecting information of the script that is run on the server, the server list that runs a script name is minimized, and the number of servers that execute the script is reduced, therefore saving system resources.

Figure 2:
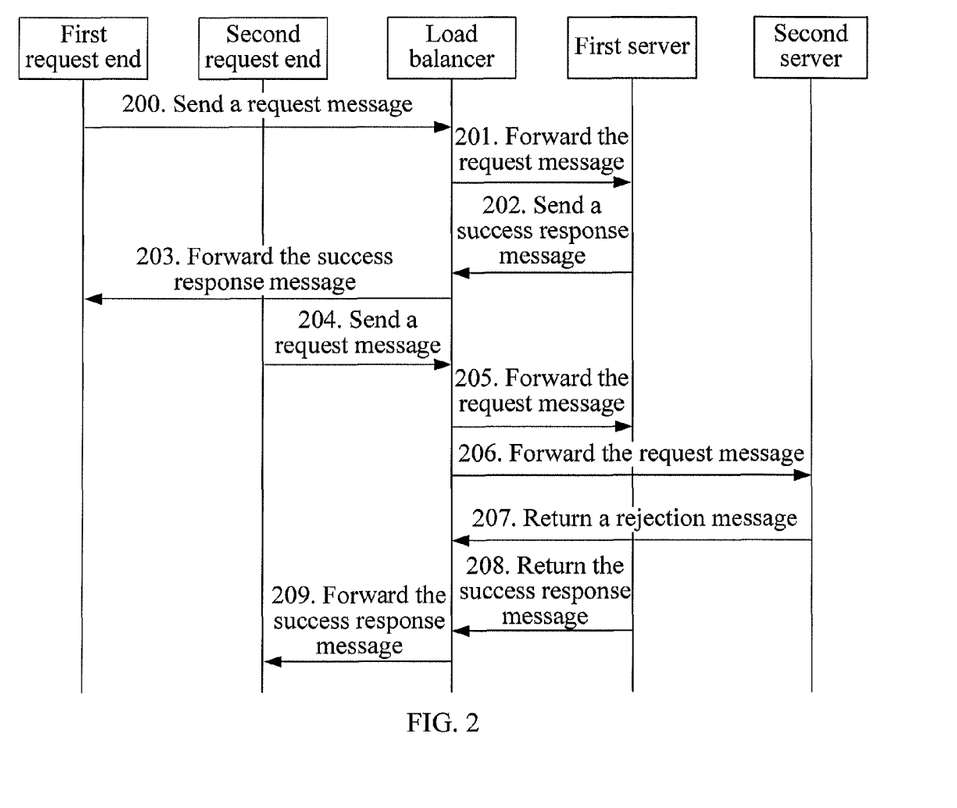
FIG. 2 is a signaling diagram of a method for processing a request message according to Embodiment 2 of the present invention.

FIG. 2 is a signaling diagram of a method for processing a request message according to Embodiment 2 of the present invention. As shown in FIG. 2, the method includes the following steps.

Step 200: A load balancer receives a request message sent by a first request end, parses the request message to obtain a service name and an operation name, and judges that the request message is an initial request message of a script through the service name and the operation name.

Step 201: The load balancer traverses a server list that is currently executing the script name to obtain a first server that is not overloaded, and forwards the request message to the first server and records a connection mapping relationship.

Step 202: The load balancer receives a success response message sent by the first server and obtains the request end of the success response message according to the connection mapping relationship corresponding to the success response message.

Step 203: The load balancer forwards the success response message to the corresponding first request end.

Step 204: The load balancer receives a request message sent by a second request end.

Step 205: The load balancer parses the request message to obtain a service name and an operation name, knows that the request message is not the initial message of the script after matching the service name and the operation name with the initial message of the script, obtains the server list that is currently executing the script name, where the list records two servers, namely, the first server and a second server, and forwards the request message to the first server and records the connection mapping relationship.

Step 206: Forward the request message to the second server and record the connection mapping relationship.

Step 207: Since the request message does not match the script that is run on the second server, the second server returns a rejection message of "400 reject". Since the rejection message is returned, the load balancer deletes a relevant item in the connection mapping relationship.

Step 208: The load balancer receives the success response message sent by the first server and obtains the request end corresponding to the response message according to the connection mapping relationship.

Step 209: Send the response message to the second request end and delete related resources.

In this embodiment, the interaction between the load balancer and the server is reduced as much as possible. Since the specific instance that serves the request message can be completely correctly located only by using "http header" parsing, XML parsing, and XPATH parsing, the judgment for a request message session is performed at the server side. Requests inside the session are distributed to all background servers where a Business Process Execution Language (BPEL) composition script has been run. The server that is processing the session correctly processes the request, and other servers reject the request. The initial request message of the script is distributed to other servers only after the load of the server that originally serves the "BPEL" script reaches a critical point. In this way, the session hold problem of a composition engine cluster is solved, and the computing task of the load balancer is reduced as well, therefore satisfying the demand for a large capacity of the composition engine.

Figure 3:
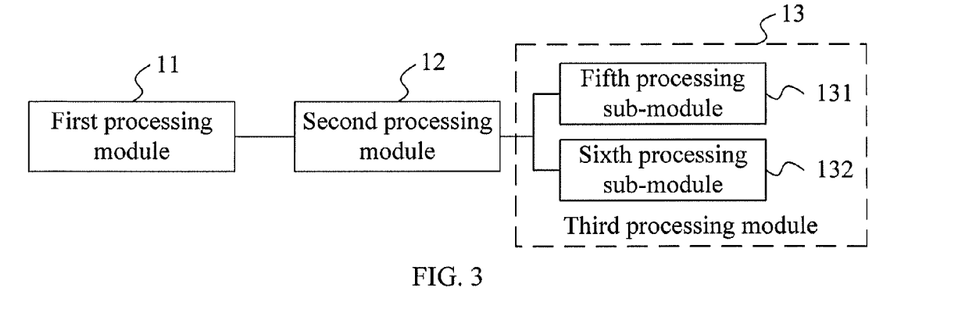
FIG. 3 is a schematic structure diagram of a load balancer device according to Embodiment 1 of the present invention.

FIG. 3 is a schematic structure diagram of a load balancer device according to Embodiment 1 of the present invention. As shown in FIG. 3, the load balancer device includes a first processing module 11, a second processing module 12, and a third processing module 13.

The first processing module 11 is configured to receive and parse a request message sent by a request end, and obtain a script name corresponding to the request message and a message type of the request message.

The second processing module 12 is configured to obtain a target server of the request message according to a server list corresponding to the script name and the message type, and forward the request message to the target server.

The third processing module 13 is configured to receive a response message returned by the target server after the target server executes a script corresponding to the script name, and return a response message that satisfies a return condition to the request end.

Specifically, the first processing module 11 of the load balancer device disposed between the request end and multiple servers receives the request message sent by the request end, parses the request message to obtain two parameters, namely, a service name and an operation name, then obtains the script name corresponding to the request message according to the service name, and judges the message type of the request message according to the operation name, namely, judges whether the request message is an initialization message of the script. The load balancer device may perform corresponding processing according to whether the request message is an initialization message or a non-initialization message. The second processing module 12 first determines the target server according to the server list corresponding to the script name and the message type, and then forwards the request message to the target server. After the target server runs a script instance and returns a response message, the load balancer device receives the response message through the third processing module 13, determines the response message that satisfies a return condition, and returns the response message that satisfies the return condition to the request end. Further, the third processing module 13 includes a fifth processing sub-module 131, configured to return the response message indicating successful execution to the request end. The third processing module 13 further includes a sixth processing sub-module 132, configured to return a last received rejection message to the request end if all the target servers return rejection messages.

For the specific operation mode of the load balancer device according to this embodiment, reference may be made to the above method embodiments.

The load balancer device according to the embodiment of the present invention forwards the request message to the target server through the script name corresponding to the request message and the message type of the request message, the target server makes a response and returns a response message, and the load balancer device selects the success response message to return to the request end. In this way, the load balancer device obtains the service name and the operation name through simple string matching, and the obtaining of the "correction" value is performed at the server side, thereby solving the session hold problem of a composition engine cluster, reducing the computing task of the load balancer, maximizing the fan-out capability of the load balancer device, and increasing the throughput of the composition engine cluster to a maximum extent, therefore satisfying the demand for a large capacity of the composition engine.

Figure 4:
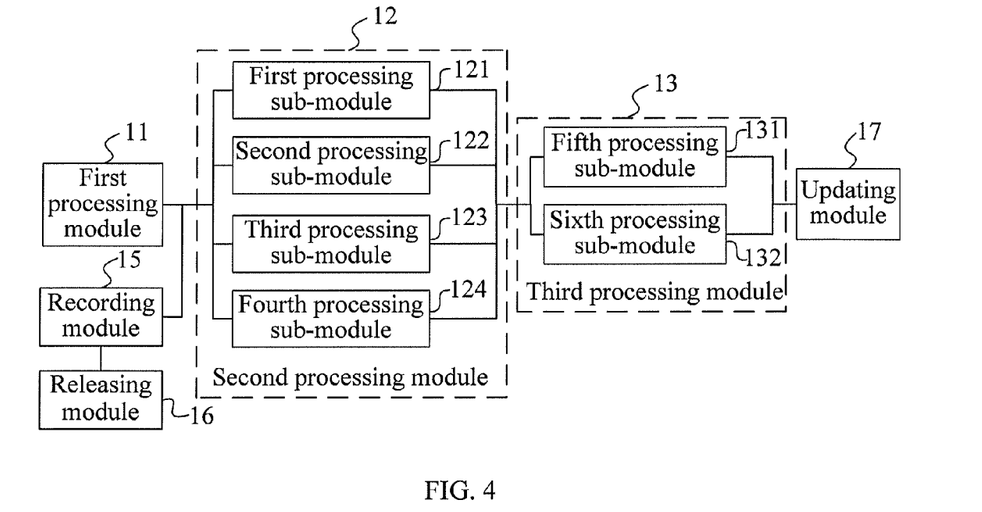
FIG. 4 is a schematic structure diagram of a load balancer device according to Embodiment 2 of the present invention.

FIG. 4 is a schematic structure diagram of a load balancer device according to Embodiment 2 of the present invention.

As shown in FIG. 4, the load balancer device includes a first processing module 11, a second processing module 12, and a third processing module 13. Based on the above embodiment, the first processing module 11 is mainly configured to receive and parse various request messages from a transport layer and send a parsing result to the second processing module 12 for processing; and the second processing module 12 is responsible for dispatching the request message according to information such as the parsing result and a session state of a current system, and sending the request message to a proper server.

Further, the second processing module 12 includes any one of or a combination of a first processing sub-module 121, a second processing sub-module 122, a third processing sub-module 123, and a fourth processing sub-module 124.

The first processing sub-module 121 is configured to select a server with the least load among servers that are not overloaded in an entire system as a target server if the request message is an initialization message and a server list corresponding to the script name is empty, forward the request message to the target server, and add an address of the target server to the server list corresponding to the script name.

The second processing sub-module 122 is configured to select a server that is not overloaded from servers recorded in the server list as the target server if the request message is an initialization message and the server list corresponding to the script name is not empty, and forward the request message to the target server.

The third processing sub-module 123 is configured to select a server with the least load among servers that are not recorded in the server list and are not overloaded in the entire system as the target server if the request message is an initialization message, the server list corresponding to the script name is not empty, and servers recorded in the server list are all overloaded, forward the request message to the target server, and add the address of the target server to the server list.

The fourth processing sub-module 124 is configured to select all servers recorded in the server list corresponding to the script as the target servers if the request message is not an initialization message, and forward the request message to the target servers.

For functions of the sub-modules mentioned above, reference may be made to the above method embodiments. Details will not be described herein again.

Optionally, the load balancer device may further include a recording module 15, configured to store a connection mapping relationship between the request end and the target server. The recording module 15 is mainly configured to access various types of session information, so as to ensure the continuity of a session.

Optionally, the load balancer device may further include a release module 16. The release module 16 is connected to the recording module 15 and is configured to delete the connection mapping relationship between the request end and the target server in the server list corresponding to the request message after the server finishes executing a script instance and returns a response message and the load balancer device returns a success response message to the request end.

Optionally, the load balancer device may further include an updating module 17, configured to set a time stamp of the target server recorded in the server list to a current time after the request message is forwarded to the target server, periodically receive a script list that is not run reported by the target server, compare a report time and the time stamp of the target server in the server list corresponding the script name, and delete the address of the target server in the server list if the report time is later than the time stamp. The load balancer device constantly updates the server list through the update module 17, so as to save system resources.

Moreover, the load balancer device may further include a server monitoring and management module, configured to monitor a health status and a load status of the server, and manage addition and deletion of the server.

Through the load balancer device according to the embodiment of the present invention, the interaction between the load balancer and the server is reduced as much as possible. The judgment of a request message session is performed at a server side. Requests inside the session are distributed to all background servers where the "BPEL" composition script has been run. The server that is processing the session correctly processes the request, and other servers reject the request. The initial request message of the script is distributed to other servers only after the load of the server that originally serves the "BPEL" script reaches a critical point. In this way, the session hold problem of a composition engine cluster is solved, and the computing task of the load balancer is reduced as well, therefore satisfying the demand for a large capacity of the composition engine.

Figure 5:
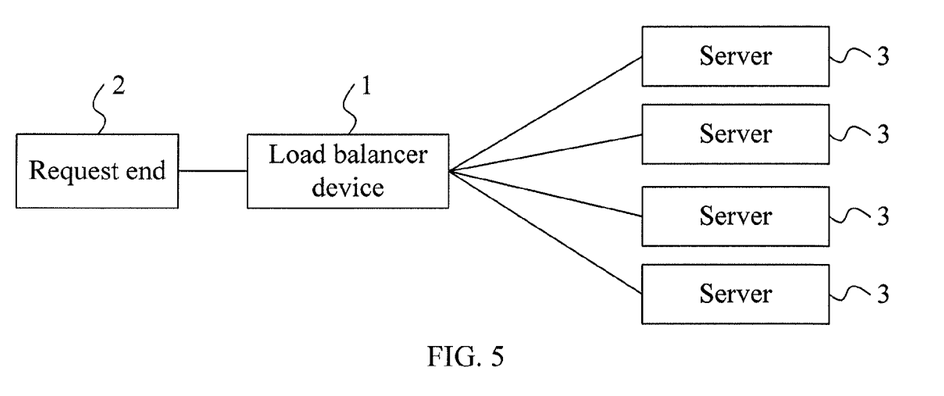
FIG. 5 is a schematic constitutional diagram of a system for processing a request message according to an embodiment of the present invention.

FIG. 5 is a schematic constitutional diagram of a system for processing a request message according to an embodiment of the present invention. As shown in FIG. 5, the system for processing the request message includes a request end 2 and multiple servers 3, and further includes a load balancer device 1 disposed between the request end and the multiple servers. The load balancer device 1 receives a request from the request end 2, sends the request message to subsequent one or more servers 3 through the above method processing procedure, receives response messages from the servers 3, and forwards a proper response message to the request end 2. For the load balancer device involved in the system for processing the request message according to this embodiment, the load balancer device according to the above method and apparatus embodiments may be used. The functions and structure of the load balancer device will not be described herein again.

In the system for processing the request message according to the embodiment of the present invention, the load balancer obtains a service name and an operation name through simple string matching, and a large amount of computing is performed at the server side, thereby solving the session hold problem of a composition engine cluster, reducing the computing task of the load balancer, maximizing the fan-out capability of the load balancer, and increasing the throughput of the composition engine cluster to a maximum extent, therefore satisfying the demand for a large capacity of the composition engine.

For the interaction and related information of units provided in the apparatus, server, and system embodiments of the present invention, reference may be made to relevant processes of the aforementioned method embodiments. For specific functions and processing procedures, reference may be made to the aforementioned embodiments. Details will not be described herein again.

Persons of ordinary skill in the art should understand that, all or a part of the steps of the method according to the embodiments may be implemented by a program instructing relevant hardware. The program may be stored in a computer readable storage medium. When the program is executed, the steps of the method according to the embodiments are performed. The storage medium may be any medium capable of storing program codes, such as a ROM, a RAM, a magnetic disk, or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not cause the essence of corresponding technical solutions to depart from the spirit and scope of the present invention.

What is claimed is:

1. A method for processing a request message, comprising:
    receiving and parsing a request message sent by a request end, and obtaining a script name corresponding to the request message and a message type of the request message, wherein the message type is one of an initialization message and a non-initialization message;
    obtaining at least one target server of the request message according to a server list corresponding to the script name and the message type, and forwarding the request message to the at least one target server;
    receiving a response message returned by a first target server of the at least one target server after the first target server executes a script corresponding to the script name: and
    returning the response message that satisfies a return condition to the request end;
    wherein after the obtaining the at least one target server of the request message according to the server list corresponding to the script name and the message type and forwarding the request message to the at least one target server, further comprising:
        setting a time stamp of the first target server of the at least one target server recorded in the server list to a current time;
        periodically receiving a script list that is not run reported by the first target server;
        comparing a report time of the first target server and the time stamp of the first target server recorded in the server list corresponding to the script name;
        deleting an address of the first target server in the server list if the report time is later than the time stamp;
        receiving at least one rejection message from the at least one target server; and
        returning a last received rejection message of the at least one rejection message to the request end.

2. The method for processing a request message according to claim 1, wherein the returning the response message that satisfies the return condition to the request end comprises:
    returning a response message indicating successful execution to the request end.

3. The method for processing a request message according to claim 1, wherein the obtaining the at least one target server of the request message according to the server list corresponding to the script name and the message type and forwarding the request message to the at least one target server comprises one of:
    selecting a server with the least load among servers that are not overloaded in an entire system as the at least one target server if the request message is an initialization message and the server list corresponding to the script name is empty, forwarding the request message to the at least one target server, and adding an address of the at least one target server to the server list corresponding to the script name;
    selecting a server that is not overloaded from servers recorded in the server list as the at least one target server if the request message is an initialization message and the server list corresponding to the script name is not empty, and forwarding the request message to the at least one target server;
    selecting a server with the least load among servers that are not recorded in the server list and are not overloaded in the entire system as the at least one target server if the request message is an initialization message, the server list corresponding to the script name is not empty, and servers recorded in the server list are all overloaded, forwarding the request message to the at least one target server, and adding an address of the at least one target server to the server list;
    directly rejecting the request message if the request message is an initialization message and servers in the entire system are all overloaded;
    selecting all servers recorded in the server list corresponding to the script name as plurality of target servers if the request message is not an initialization message, and forwarding the request message to the target servers; and
    directly rejecting the request message if the request message is not an initialization message and the server list corresponding to the script name is empty.

4. The method for processing a request message according to claim 2, wherein the obtaining of the at least one target server of the request message according to the server list corresponding to the script name and the message type and forwarding the request message to the at least one target server comprises one of:
    selecting a server with the least load among servers that are not overloaded in an entire system as the at least one target server if the request message is an initialization message and the server list corresponding to the script name is empty, forwarding the request message to the at least one target server, and adding an address of the at least one target server to the server list corresponding to the script name;
    selecting a server that is not overloaded from servers recorded in the server list as the at least one target server if the request message is an initialization message and the server list corresponding to the script name is not empty, and forwarding the request message to the at least one target server;
    selecting a server with the least load among servers that are not recorded in the server list and are not overloaded in the entire system as the at least one target server if the request message is an initialization message, the server list corresponding to the script name is not empty, and servers recorded in the server list are all overloaded, forwarding the request message to the at least one target server, and adding an address of the at least one target server to the server list;
    directly rejecting the request message if the request message is an initialization message and servers in the entire system are all overloaded;
    selecting all servers recorded in the server list corresponding to the script name as plurality of target servers if the request message is not an initialization message, and forwarding the request message to the plurality of target servers; and
    directly rejecting the request message if the request message is not an initialization message and the server list corresponding to the script name is empty.

5. The method for processing a request message according to claim 2, wherein the returning of the response message indicating successful execution to the request end comprises one of:
  directly returning the response message indicating successful execution returned by the at least one target server after the at least one target server executes the script corresponding to the script name to the request end if a connection length of the server list corresponding to the request message is 1; and
  returning the response message indicating successful execution among multiple response messages returned by plurality of target servers after the plurality of target servers execute the script corresponding to the script name to the request end if the connection length of the server list corresponding to the request message is greater than 1.

6. The method for processing a request message according to claim 2, after the obtaining the at least one target server of the request message according to the server list corresponding to the script name and the message type and forwarding the request message to the at least one target server, further comprising:
  setting a time stamp of the at least one target server recorded in the server list to a current time.

7. A load balancer device, comprises a processor operating in conjunction with a memory storing computer executable instructions, when the executable instructions are executed, the processor causes the load balancer device to:
  receive and parse a request message sent by a request end, and obtain a script name corresponding to the request message and a message type of the request message, wherein the message type is one of an initialization message or a non-initialization message;
  obtain at least one target server of the request message according to a server list corresponding to the script name and the message type, and forward the request message to the at least one target server;
  wherein the load balancer device is further caused to:
    receiving a response message returned by a first target server of the at least one target server after the first target server executes a script corresponding to the script name; and
    returning the response message that satisfies a return condition to the request end;
    set a time stamp of the first target server of the at least one target server recorded in the server list to a current time after the request message is forwarded to the first target server of the at least one target server, periodically receive a script list that is not run reported by the first target server of the at least one target server, compare a report time and the time stamp of the first target server of the at least one target server in the server list corresponding the script name, and delete an address of the first target server of the at least one target server in the server list if the report time is later than the time stamp;
  receive at least one rejection message from the at least one target server; and
  return a last received rejection message of the at least one rejection message to the request end.

8. The load balancer device according to claim 7, wherein the load balancer device is further caused to:
  return a response message indicating successful execution to the request end.

9. The load balancer device according to claim 7, wherein the load balancer device is caused to perform any one of or a combination of the following:
  to select a server with the least load among servers that are not overloaded in an entire system as the at least one target server if the request message is an initialization message and the server list corresponding to the script name is empty, forward the request message to the at least one target server, and add an address of the at least one target server to the server list corresponding to the script name;
  to select a server that is not overloaded from servers recorded in the server list as the at least one target server if the request message is an initialization message and the server list corresponding to the script name is not empty, and forward the request message to the at least one target server;
  to select a server with the least load among servers that are not recorded in the server list and are not overloaded in the entire system as the at least one target server if the request message is an initialization message, the server list corresponding to the script name is not empty, and servers recorded in the server list are all overloaded, forward the request message to the at least one target server, and add the address of the at least one target server to the server list; and
  to select all servers recorded in the server list corresponding to the script name as a plurality of target servers if the request message is not an initialization message, and forward the request message to the plurality of target servers.

10. The load balancer device according to claim 8, wherein the load balancer device is caused to perform any one of or a combination of the following:
  to select a server with the least load among servers that are not overloaded in an entire system as the at least one target server if the request message is an initialization message and the server list corresponding to the script name is empty, forward the request message to the at least one target server, and add an address of the at least one target server to the server list corresponding to the script name;
  to select a server that is not overloaded from servers recorded in the server list as the at least one target server if the request message is an initialization message and the server list corresponding to the script name is not empty, and forward the request message to the at least one target server;
  to select a server with the least load among servers that are not recorded in the server list and are not overloaded in the entire system as the at least one target server if the request message is an initialization message, the server list corresponding to the script name is not empty, and servers recorded in the server list are all overloaded, forward the request message to the at least one target server, and add the address of the at least one target server to the server list; and
  to select all servers recorded in the server list corresponding to the script name as a plurality of target servers if the request message is not an initialization message, and forward the request message to the plurality of target servers.

11. A system for processing a request message, comprising a request end and multiple servers, and further comprising the load balancer device according to claim 7, which is disposed between the request end and the multiple servers.

* * * * *